United States Patent
Shen et al.

(10) Patent No.: US 9,032,227 B2
(45) Date of Patent: May 12, 2015

(54) WIRELESS COMMUNICATION APPARATUS AND POWER MANAGEMENT METHOD FOR THE SAME

(75) Inventors: Jia-Ching Shen, Taipei (TW); Chun-Wei Kuo, Tainan (TW)

(73) Assignee: RealTek Semiconductor Corp., Hsinchu (TW)

(*) Notice: Subject to any disclaimer, the term of this patent is extended or adjusted under 35 U.S.C. 154(b) by 530 days.

(21) Appl. No.: 12/692,317

(22) Filed: Jan. 22, 2010

(65) Prior Publication Data

US 2010/0191992 A1  Jul. 29, 2010

(30) Foreign Application Priority Data

Jan. 23, 2009 (TW) ............... 98102865 A
Jan. 7, 2010 (TW) ............... 99100253 A

(51) Int. Cl.
*G06F 1/32* (2006.01)
(52) U.S. Cl.
CPC .............. *G06F 1/325* (2013.01); *G06F 1/3215* (2013.01); *Y02B 60/50* (2013.01)
(58) Field of Classification Search
CPC ... H04W 52/0225; G06F 1/3215; G06F 1/325
USPC ................................................. 713/320, 300
See application file for complete search history.

(56) References Cited

U.S. PATENT DOCUMENTS

| | | | |
|---|---|---|---|
| 6,721,355 B1 * | 4/2004 | McClennon et al. | 375/222 |
| 7,564,810 B2 * | 7/2009 | Hernandez et al. | 370/311 |
| 7,733,835 B2 | 6/2010 | Sammour et al. | |
| 7,769,414 B2 * | 8/2010 | Yoon et al. | 455/574 |
| 7,835,299 B2 * | 11/2010 | Wertheimer | 370/252 |
| 7,865,744 B2 * | 1/2011 | Lee et al. | 713/300 |
| 8,340,111 B1 * | 12/2012 | Krivitski et al. | 370/419 |

FOREIGN PATENT DOCUMENTS

| | | |
|---|---|---|
| CN | 1561057 A | 1/2005 |
| TW | 200803219 A | 1/2008 |
| TW | 200843389 A | 11/2008 |

OTHER PUBLICATIONS

English Abstract translation of CN1561057 (Published Jan. 5, 2005).
English Abstract translation of TW200843389 (Published Nov. 1, 2008).

* cited by examiner

*Primary Examiner* — Kim Huynh
*Assistant Examiner* — Eric Chang
(74) *Attorney, Agent, or Firm* — McClure, Qualey & Rodack, LLP

(57) ABSTRACT

A wireless communication apparatus is adapted for communication between a host and a communication device. The wireless communication apparatus includes a host transmission interface adapted to be coupled to the host, a host transmission interface controller coupled to the host transmission interface, a wireless transmission interface adapted for communicating with the communication device so as to receive packet data therefrom, a wireless transmission interface controller coupled to the wireless transmission interface, and a processor coupled between the host transmission interface controller and the wireless transmission interface controller. The processor is operable to control a power state of the host transmission interface controller to enter a power consuming mode selected in accordance with a traffic volume.

21 Claims, 6 Drawing Sheets

WIRELESS COMMUNICATION APPARATUS AND POWER MANAGEMENT METHOD FOR THE SAME

CROSS-REFERENCE TO RELATED APPLICATION

This application claims priority of Taiwanese Application No. 098102865, filed on Jan. 23, 2009, and Taiwanese Application No. 099100253, filed on Jan. 7, 2010.

BACKGROUND OF THE INVENTION

1. Field of the Invention

The present invention relates to a power management method, more particularly to a power management method for a wireless communication apparatus.

2. Description of the Related Art

Referring to FIG. 1, an existing wireless communication apparatus 9, such as a wireless network card, is coupled to a host 90 and a communication device 99 (for example, a base station, an access point device, a peer-to-peer device, etc.) through a host transmission interface 91 and a wireless communication interface 92, respectively.

Power consumption of the wireless communication interface 92 is a major portion of overall power consumption of the wireless communication apparatus 9. Thus, the wireless communication interface 92 is generally designed to be target of power saving. For example, in the IEEE 802.11 standard, two types of power modes are provided; one is active mode (also called continuous aware mode) and the other one is power saving mode. A designer of the wireless communication apparatus 9 can design a communication protocol between the wireless communication interface 92 and the communication device 99 under the IEEE 802.11 standard such that the power consumption of the wireless communication apparatus 9 can be reduced when a traffic volume is relatively low. For example, in a current power management method, the wireless communication interface 92 enters the power saving mode when the wireless communication apparatus 9 does not receive packets within a predetermined length of time. However, when the packets are received, the wireless communication interface 92 is restored to the power saving mode only after the predetermined length of time has elapsed. In addition, in the power saving mode, the wireless communication interface 92 is woken at predetermined intervals for receiving signals from the communication device 99 so as to maintain connection with the communication device 99. It can be seen that, in the existing power management method for the wireless communication interface 92, there is still much time periods in which the power consumption of the wireless communication interface 92 could be reduced but is wasted on waiting.

Regarding the host transmission interface 91, according to a master-slave architecture of the host 90 (serving as a master) and the wireless communication apparatus 9 (serving as a slave), a power state of the host transmission interface 91 is controlled by the host 90. That is to say, the host 90 is operable to transmit a command allowing the host transmission interface 91 to enter a low power consuming mode. Under such architecture, control circuits of the host transmission interface 91 must be in the continuous aware mode for fast inspection of signals from the host 90 and for responding to the host 90 within a response time required by the communication protocol so as to maintain normal connection between the host transmission interface 91 and the host 90. Moreover, in order to be ready to receive external packets at any time, the host 90 does not actively reduce power to the host transmission interface 91 in general. Therefore, the host transmission interface 91 does not often enter the low power consuming mode, and the period of entering the low power consuming mode is relatively short such that it is inefficient in saving power. In addition, since power consuming modes of the host transmission interface 91 cooperate with an operating system of the host 90 in general, design on the host transmission interface 91 related to power saving is often neglected.

However, due to development of high speed transmission interfaces, an interface bus with high transmission speed is now used in the host transmission interface 91. As working frequency of control circuits of the interface bus becomes higher, power consumption of the host transmission interface 91 has an increasing proportion in the overall power consumption of the wireless communication apparatus 9. In this situation, power management for the host transmission interface 91 has become relatively important.

Based on available techniques, aside from the above-mentioned disadvantages that the wireless communication interface 92 and the host transmission interface 91 are inefficient in saving power, designs of the wireless communication interface 92 and the host transmission interface 91 for controlling power states thereof are independent from each other. In this situation, for example, when the host transmission interface 91 enters the power saving mode according to the power state set by the host 90, the wireless communication interface 92 may have just been woken up for receiving signals from the communication device 99. Such non-synchronization results in failure to optimize power management for the wireless communication apparatus 9.

SUMMARY OF THE INVENTION

Therefore, an object of the present invention is to provide a wireless communication apparatus, and a power management method for the wireless communication apparatus capable of increasing time periods in which the wireless communication apparatus is in a deep low power consuming mode.

Accordingly, a wireless communication apparatus of the present invention uses an embedded digital signal processing/application-specific integrated circuit (DSP/ASIC) controller (hereinafter referred to as processor) to inspect activities of a wireless transmission interface and a host transmission interface of the wireless communication apparatus (i.e., to inspect a traffic volume). The processor further inspects power states of the wireless and host transmission interfaces and the wireless communication apparatus in real-time so as to control the power states to be in an optimum state.

Existing circuit designs are applied in the present invention for power saving. Circuits of a host transmission interface controller of the wireless communication apparatus are further divided into three areas, i.e., a first waking-up circuit area, a second waking-up circuit area, and an inspecting circuit area. The first waking-up circuit area requires greater power consumption, but can be woken up faster. The first waking-up circuit area includes a physical layer and a media access control layer of a communication protocol, and is referred to as fast waking-up area hereinafter. The second waking-up circuit area requires medium power consumption, but a wake-up response time thereof is relatively longer. The second waking-up circuit area is mainly responsible for generating clock pulses, and is referred to as slow waking-up area hereinafter. The inspecting circuit area requires low power consumption, and is used for inspecting a bus of the host transmission interface.

In the fast waking-up area of the host transmission interface controller, the circuit related to the communication protocol is mainly controlled by a host, which is coupled to the wireless communication apparatus, according to the communication protocol between the host and the wireless communication apparatus. However, under the communication protocol, the processor is operable to control the power state of the host transmission interface controller to turn off the fast waking-up area or the fast and slow waking-up areas according to an algorithm to be described hereinafter. At the same time, through a driver installed in the host, the processor is able to control the communication protocol of the host transmission interface so as to provide a new dynamic power managing protocol.

The dynamic power managing protocol and mechanism under the control of the processor involves a set of protocols for negotiation between a driver installed in the host and the processor, and protocol procedures defining an initiator and a responder of the protocol. The protocol defines the dynamic power managing mechanism implemented using the processor, and behaviors of the two interfaces corresponding to the mechanism.

Generally, the processor is operable to implement the following procedures.

1. Implementation of the Algorithm for Controlling the Power State of the Host Transmission Interface Controller:

The processor is operable to control the power state of the host transmission interface controller to enter a deep low power consuming mode when the traffic volume is smaller than a first threshold value, a fast wake-up mode when the traffic volume is not smaller than the first threshold value and is smaller than a second threshold value larger than the first threshold value, and an active mode when the traffic volume is greater than the second threshold value. Certainly, the present invention is not limited to the above-mentioned power consuming modes. According to different interfaces and definitions in the operating system of the host, classification names and details of the power consuming modes may differ.

2. Controlling Data Transmission Through the Bus:

Regarding the data received by the wireless transmission interface for transmission the host, the processor is operable to accumulate and transmit the received data to the host in bursts. Further, the processor is operable to implement deferred signaling and report mechanism.

3. Controlling the Power State of the Host Transmission Interface Controller:

According to the protocol of the wireless transmission interface and the power managing protocol with the driver in the host, the processor is operable to control the power state of the host transmission interface controller.

In connection with the driver in the host and the power managing protocol of the processor, a number of times of action between the host transmission interface controller and the host transmission interface is reduced when the host transmission interface controller is in the fast wake-up mode. The host is configured to send a wake-up signal to the wireless communication apparatus when there is a requirement of data transmission. Further, when the host transmission interface controller is in the deep low power consuming mode, the processor is operable to wake up the host transmission interface controller when a predetermined wake-up time is reached. The processor is also operable to accumulate and to transmit the received data in bursts.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
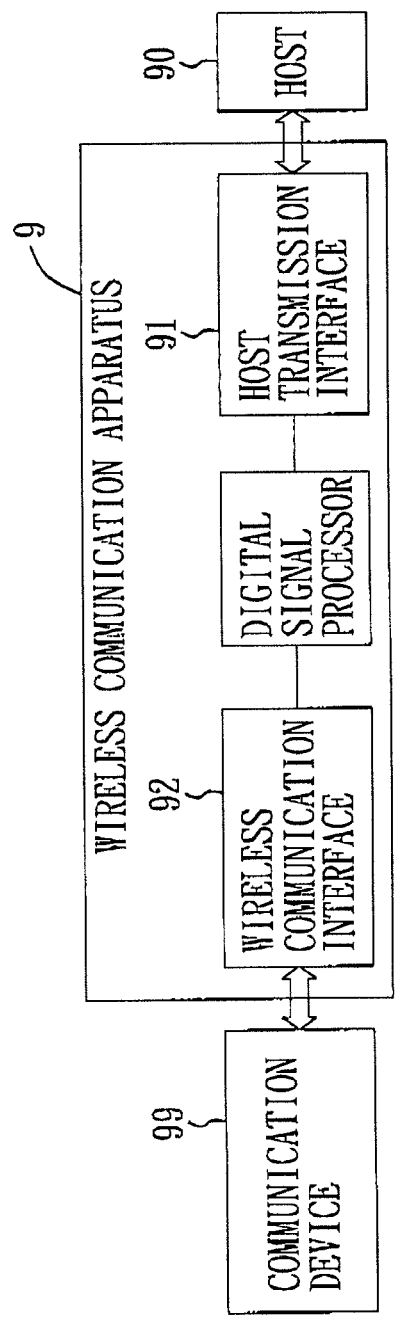
FIG. 1 is a system block diagram of a conventional wireless communication apparatus.
Figure 2:
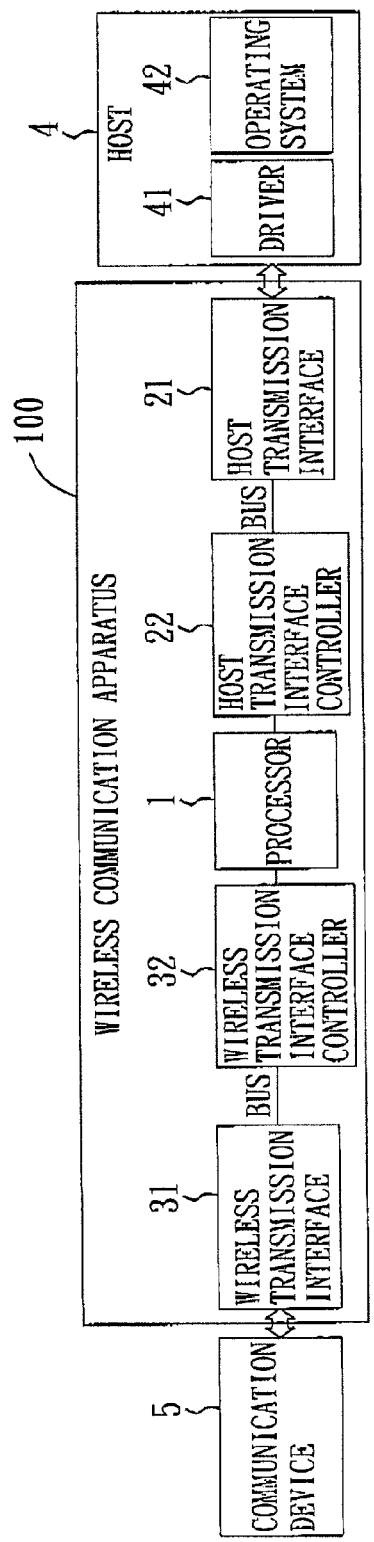
FIG. 2 is a system block diagram of a preferred embodiment of a wireless communication apparatus of the present invention.

Referring to FIG. 2, the preferred embodiment of a wireless communication apparatus 100 according to this invention includes a processor 1, a host transmission interface 21 adapted to be coupled to a host 4, a host transmission interface controller 22 coupled to the host transmission interface 21 through a bus, a wireless transmission interface 31 adapted for communicating with a communication device 5, and a wireless transmission interface controller 32 coupled to the wireless transmission interface 31 through a bus. The processor 1 is coupled between the host transmission interface controller 22 and the wireless transmission interface controller 32. The host 4 is installed with an operating system 42 and a driver 41.

Figure 3:
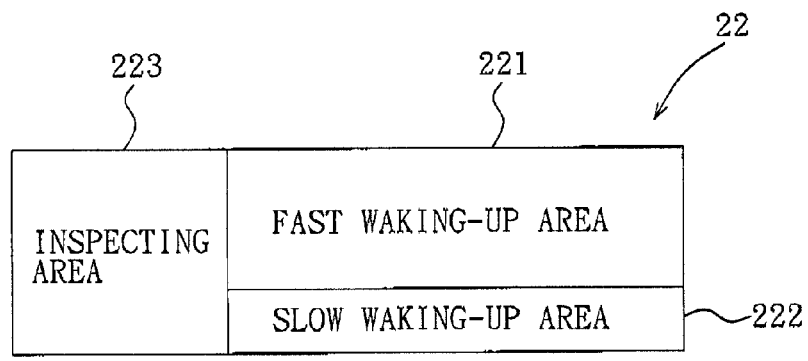
FIG. 3 is a schematic diagram of circuit areas of a host transmission interface controller of the wireless communication apparatus of the preferred embodiment.

Referring to FIGS. 2 and 3, circuits of the host transmission interface controller 22 are divided into a first waking-up circuit area, a second waking-up circuit area, and an inspecting circuit area. The first waking-up circuit area requires greater power consumption, but can be woken up faster. The first waking-up circuit area includes a physical layer and a media access control layer of a communication protocol, and is referred to as fast waking-up area 221 hereinafter. The second waking-up circuit area requires medium power consumption, but a wake-up response time thereof is relatively longer. The second waking-up circuit area includes a pulse generating circuit for generating clock pulses, and is referred to as slow waking-up area 222 hereinafter. The inspecting circuit area requires low power consumption, and is used for inspecting the bus of the host transmission interface 21. The inspecting circuit area is referred to as inspecting area 223 hereinafter.

Figure 4:
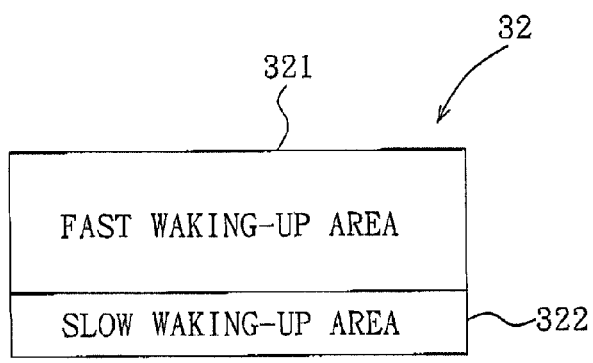
FIG. 4 is a schematic diagram of circuit areas of a wireless transmission interface controller of the wireless communication apparatus of the preferred embodiment.

Referring to FIGS. 2 and 4, in this embodiment, circuits of the wireless transmission interface controller 32 are only divided into a third waking-up circuit area and a fourth waking-up circuit area. The third waking-up circuit area requires greater power consumption but can be woken up faster, and is referred to as fast waking-up area 321 hereinafter. The fourth waking-up circuit area requires medium power consumption, but a wake-up response time thereof is relatively longer. The fourth waking-up circuit area is referred to as slow waking-up area 322 hereinafter.

In this embodiment, a power state of the wireless transmission interface controller 32 is controlled by the processor 1 according to a communication protocol of the wireless transmission interface 31. For example, in a system based on the IEEE 802.11 standard, the processor 1 is operable to determine whether a state of the wireless transmission interface controller 32 satisfies a basic condition of the communication protocol for entering a low power consuming mode according to power managing standards of IEEE 802.11. The power state of the wireless transmission interface controller 32 includes a low power consuming state, a deep low power consuming state and an active state. In the low power consuming state, power to the fast waking-up area 321 is turned off. In the deep low power consuming state, power to the fast and slow waking-up areas 321 and 322 of the wireless transmission interface controller is turned off. In the active state, power to the fast waking-up area 321 and the slow waking-up area 322 is turned on.

Figure 5:
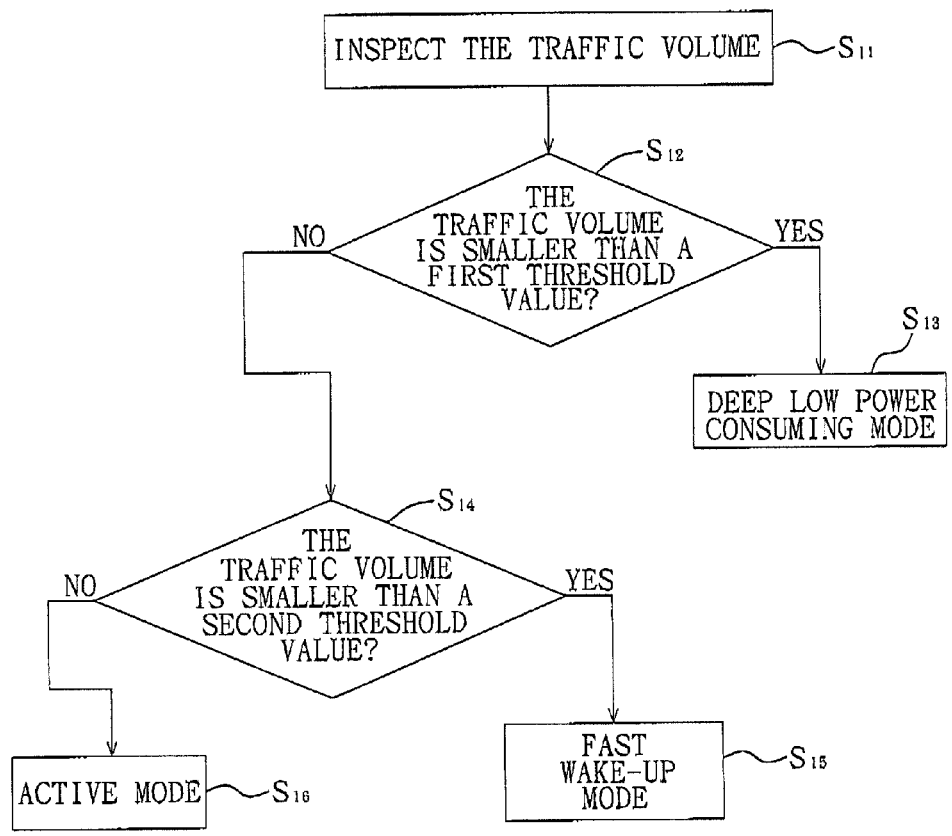
FIG. 5 is a flow chart illustrating an algorithm implemented using a processor of the wireless communication apparatus in a power management method for the wireless communication apparatus of the preferred embodiment.

Referring to FIGS. 2, 3 and 5, the processor 1 is operable to control a power state of the host transmission interface controller 22 according to an algorithm illustrated in FIG. 5. The processor 1 is operable to selectively turn off power to the fast waking-up area 221, or turn off power to the fast waking-up area 221 and the slow waking-up area 222. In detail, the processor 1 is configured to inspect a traffic volume in step ($S_{11}$). The traffic volume referred to herein includes data transmission between the host 4 and the wireless communication apparatus 100, access to a register between the host 4 and the wireless communication apparatus 100, and data transmission between the communication device 5 and the wireless communication apparatus 100. In step ($S_{12}$), the processor 1 is operable to determine whether the traffic volume is smaller than a preset first threshold value. When the traffic volume is smaller than the first threshold value, the processor 1 is operable to control the power state of the host transmission interface controller 22 to enter a deep low power consuming mode in step ($S_{13}$). When the traffic volume is not smaller than the first threshold value, the processor 1 is operable to further determine whether the traffic volume is smaller than a preset second threshold value larger than the first threshold value in step ($S_{14}$). When the traffic volume is smaller than the second threshold value, the processor 1 is operable to control the power state of the host transmission interface controller 22 to enter a fast wake-up mode in step ($S_{15}$). When the traffic volume is greater than the second threshold value, the processor 1 is operable to control the power state of the host transmission interface controller 22 to stay in an active mode in step ($S_{16}$). When the host transmission interface controller 22 is in the deep low power consuming mode, power to the fast and slow waking-up areas 221 and 222 of the host transmission interface controller 22 is turned off, and power to the inspecting area 223 is turned on. In the fast wake-up mode, power to the fast waking-up area 221 is turned off, and power to the slow waking-up area 222 and the inspecting area 223 is turned on. In the active mode, power to entire the host transmission interface controller 22 is turned on.

Aside from the above-mentioned algorithm for determining which power consuming mode the host transmission interface controller 22 should enter, the processor 1 is further operable to adjust wake-up times of the host transmission interface controller 22 according to the power state of the wireless transmission interface controller 32. The predetermined wake-up times negotiated by the processor 1 and the driver 41 in the host 4 can be determined in accordance with a time period or a multiple thereof to restore the power state of the wireless transmission interface controller 32 to the active state (a detailed description is provided in the following). The time period to restore the power state of the wireless transmission interface controller 32 to the active state is negotiated by the wireless transmission interface 31 and the communication device 5. Moreover, the processor 1 is capable of determining of a time to control the power state of the host transmission interface controller 22 to enter the deep low power consuming mode according to the power state of the wireless transmission interface controller 32.

By controlling the power state of the host transmission interface controller 22, the processor 1 can be seen as having the capability to control the power states of both of the host transmission interface controller 22 and the wireless transmission interface controller 32. The processor 1 further cooperates with a self-defined transmission protocol (a detailed description thereof is provided in the following), such that the object of enhancing efficiency of saving power can be achieved.

When the processor 1 controls the host transmission interface controller 22 according to the traffic volume, safety when decreasing power consumption of the circuits should be ensured. Thus, by cooperating with the driver 41 in the host 4, response of the host transmission interface controller 22 can be identical to that in the active mode when the host 4 has an activity.

Figure 6:
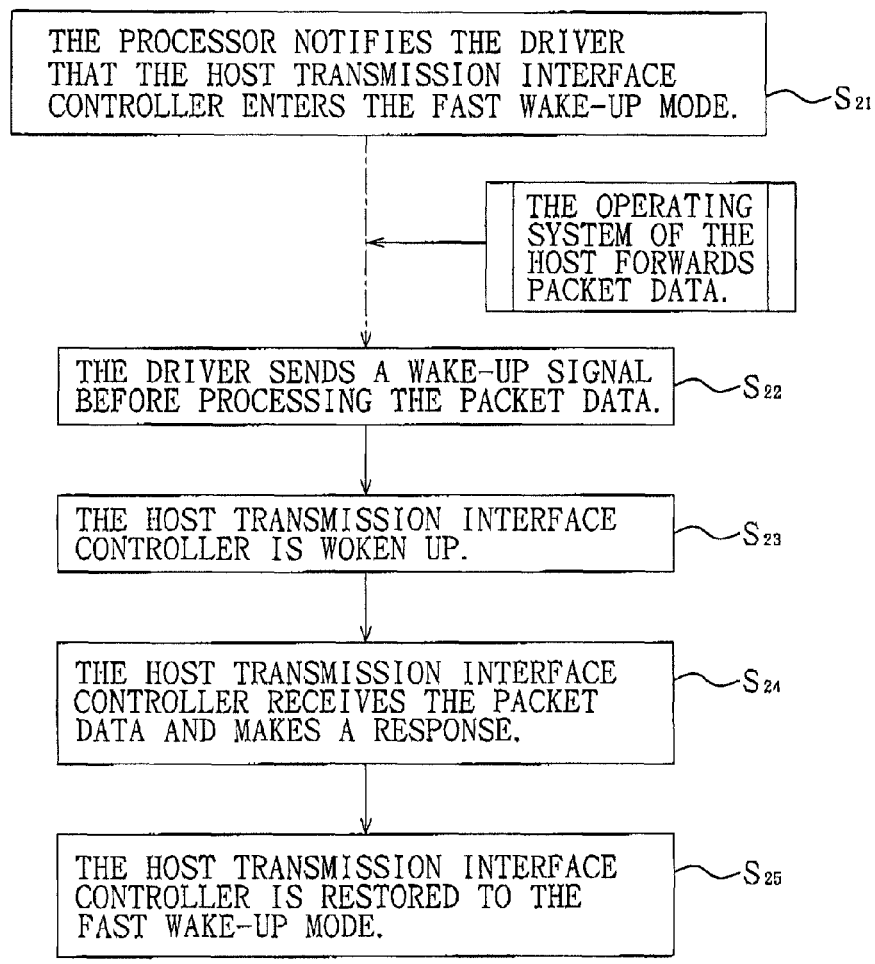
FIG. 6 is a flow chart illustrating operation of the host transmission interface controller when it is in a fast wake-up mode.

Referring to FIGS. 2, 5 and 6, when the processor 1 implements step ($S_{15}$) according to the algorithm in FIG. 5, the processor 1 controls the power state of the host transmission interface controller 22 to enter the fast wake-up mode while the power state of the wireless transmission interface controller 32 is in a power saving state (i.e., the low power consuming state or the deep low power consuming state) according to the communication protocol of the wireless transmission interface 31. At this time, the processor 1 notifies the driver 41 that the host transmission interface controller 22 enters the fast wake-up mode through the self-defined transmission protocol in step ($S_{21}$). In this situation, when the operating system 41 of the host 4 forwards packet data to the wireless communication apparatus 100, the driver 41 uses time difference in software processing to send a wake-up signal to the host transmission interface controller 22 in step ($S_{22}$) before the host transmission interface controller 22 receives the packet data. The wake-up signal directly restores the power state of all circuits of the host transmission interface controller 22 to the active mode without intervention from the processor 1. At this time, the fast waking-up area 221 of the host transmission interface controller 22 is woken up in step ($S_{23}$). In step ($S_{24}$), circuits of the host transmission interface controller 22 for receiving packet data are in the active mode, and are capable of properly receiving the packet data and making a corresponding response. After receiving the packet data and making the corresponding response, the host transmission interface controller 22 is restored to the fast wake-up mode for decreasing power consumption in step ($S_{25}$). Though the above-mentioned manner, the processor 1 is able to control the communication protocol of the host transmission interface 21 so as to provide a new dynamic power managing protocol.

Also, in the fast wake-up mode, the wireless transmission interface controller 32 is woken up in accordance with the communication protocol when packet data are transmitted from the communication device 5 to the wireless transmission interface 31. The host transmission interface controller 22 is controlled by the processor 1 to wake up for receiving the packet data, and transmits the packet data to the host 4. After transmission, the processor 1 immediately controls the power state of the wireless transmission interface controller 32 and the power state of the host transmission interface controller 22 to enter the low power consuming state and the fast wake-up mode, respectively.

Figure 7:
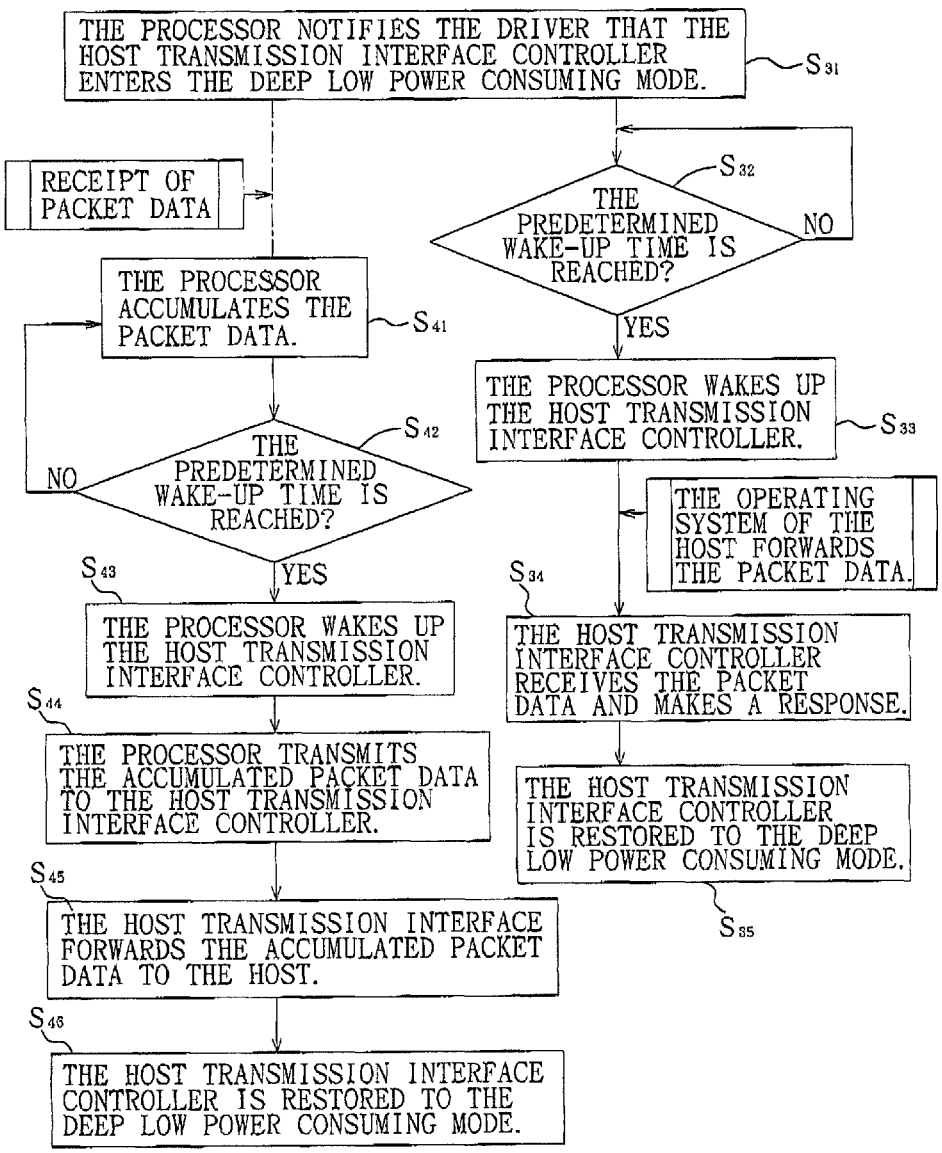
FIG. 7 is a flow chart illustrating operation of the host transmission interface controller when it is in a deep low power consuming mode.

Referring to FIGS. 2, 5 and 7, when the processor 1 implements step ($S_{13}$) according to the algorithm in FIG. 5, the processor 1 controls the power state of the host transmission interface controller 22 to enter the deep low power consuming mode while the power state of the wireless transmission interface controller 32 is in the power saving state according to the communication protocol of the wireless transmission interface 31. In step ($S_{31}$), the processor 1 notifies the driver 41 that the host transmission interface controller 22 enters the deep low power consuming mode through the self-defined transmission protocol, and the processor 1 and the driver 41 negotiate a wake-up time to switch the host transmission interface controller 22 to the active mode. Since the host transmission interface controller 22 is unable to process the packet data in the deep low power consumption mode, the processor 1 is operable to switch the host transmission interface controller 22 periodically to the active mode in which the host transmission interface controller 22 can be controlled by the host 4. In step ($S_{32}$), the processor 1 is operable to determine whether the predetermined wake-up time negotiated by the processor 1 and the driver 41 in the host 4 is reached. The processor 1 is operable to wake up the host transmission interface controller 22 in step ($S_{33}$) when the predetermined wake-up time is reached, and to repeat step ($S_{32}$) when otherwise. At this time, when the operating system 42 of the host 4 forwards packet data (e.g., direct memory access packet), the host transmission interface controller 22 is capable of properly receiving the packet data and making a corresponding response in step ($S_{34}$). Then, in step ($S_{35}$), the host transmission interface controller 22 is restored to the deep low power consuming mode according to the communication protocol of the wireless transmission interface 31.

When the wireless transmission interface 31 receives packet data from the communication device 5 at this time, the processor 1 is operable to determine a subsequent action according to the attribute of the packet data. Since most packet data do not require an immediate response, the processor 1 is operable to accumulate the received packet data in step ($S_{41}$). In step ($S_{42}$), the processor 1 is operable to determine whether the predetermined wake-up time is reached. The processor 1 is operable to wake up the host transmission interface controller 22 in step ($S_{43}$) when the predetermined wake-up time is reached, and to repeat step ($S_{41}$) when otherwise. The processor 1 transmits the accumulated packet data to the host transmission interface 21 in bursts in step ($S_{44}$), and the host transmission interface 21 forwards the accumulated packet data to the host 4 and makes a corresponding response to the host 4 in step ($S_{45}$). Then, the host transmission interface controller 22 is restored to the deep low power consuming mode in step ($S_{46}$).

Certainly, the driver 41 in the host 4 must also accumulate the packet data to be forwarded. When the predetermined wake-up time is reached, the processor 1 switches the host transmission interface controller 22 to the active mode, and the host 4 receives notification from the processor 1. Subsequently, the host 4 is able to forward the accumulated packet data. In principle, the predetermined wake-up time described hereinabove is set such that a wake-up interval of the host transmission interface controller 22 and a wake-up interval of the wireless transmission interface controller 32 are synchronized or have a multiple relation. For example, when the traffic volume is relatively small and the host transmission interface controller 22 is in the deep low power consuming mode, the wake-up intervals of the host transmission interface controller 22 and the wireless transmission interface controller 32 are synchronized as 100 ms. However, when the communication protocol between the wireless transmission interface 31 and the communication device 5 requires relatively short wake-up intervals for the wireless transmission interface controller 32, such as 50 ms, the wake-up interval of the host transmission interface controller 22 can be set as 50 ms, 100 ms, or 150 ms. The predetermined wake-up time and the wake-up interval can be set according to the traffic volume. For example, the wake-up interval can be set as 50 ms when the traffic volume is greater than a predetermined value or increases gradually, and as 150 ms when the traffic volume is smaller than the predetermined value or decreases gradually. The predetermined value is smaller than the first threshold value. Certainly, when the communication protocol between the host transmission interface 21 and the host 4 requires relatively short wake-up intervals for the host transmission interface controller 22, the wake-up interval of the wireless transmission interface controller 32 can be set as a multiple of the wake-up interval of the host transmission interface controller 22.

In other embodiments, when the host transmission interface controller 22 is in the deep low power consuming mode, the processor 1 is operable to automatically increase the wake-up interval of the host transmission interface controller 22 in case no packets require processing within a duration including N consecutive wake-up intervals (where N is a positive integer and can be determined according to requirements) or a duration in which the traffic volume is smaller than a predetermined threshold value exceeds a predetermined length of time. For example, the wake-up interval can be set as 150 ms for extending the time for saving power.

In summary, the processor 1 is used in the present invention to control the power states of the two controllers 22 and 32 for power management. Further, the self-defined protocol negotiated by the driver 41 in the host 4 allows the processor 1 to implement the power management that is originally controlled by the host 4. Under such configuration, power consumption of the circuits of the host transmission interface controller 22 can be reduced quickly such that the time for saving power can be extended as long as possible.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A wireless communication apparatus adapted for communication between a host and a communication device, the wireless communication apparatus comprising:
   a host transmission interface adapted to be coupled to the host;
   a host transmission interface controller coupled to the host transmission interface;
   a wireless transmission interface adapted for communicating with the communication device so as to receive packet data therefrom;
   a wireless transmission interface controller coupled to the wireless transmission interface; and
   a processor coupled between the host transmission interface controller and the wireless transmission interface controller, and operable to control a power state of the host transmission interface controller to enter a power consuming mode selected from a plurality of power consuming modes in accordance with a traffic volume and a plurality of traffic thresholds; wherein the processor is operable to control the power state of the host transmission interface controller to enter a deep low power consuming mode when the traffic volume is smaller than a first threshold value, a fast wake-up mode when the traffic volume is not smaller than the first threshold value and is smaller than a second threshold value larger than the first threshold value, and an active mode when the traffic volume is greater than the second threshold value.

2. The wireless communication apparatus as claimed in claim 1, wherein the host transmission interface controller includes a first waking-up circuit area, a second waking-up circuit area, and an inspecting circuit area for inspecting a bus of the host transmission interface, the processor being operable to selectively turn off power to the first waking-up circuit area, or turn off power to the first waking-up circuit area and the second waking-up circuit area.

3. The wireless communication apparatus as claimed in claim 2, wherein power consumption of the first waking-up circuit area is greater than power consumption of the second waking-up circuit area, and wake-up response time of the first waking-up circuit area is shorter than wake-up response time of the second waking-up circuit area.

4. The wireless communication apparatus as claimed in claim 2, wherein the first waking-up circuit area includes a physical layer and a media access control layer, and the second waking-up circuit area includes a pulse generating circuit.

5. The wireless communication apparatus as claimed in claim 2, wherein, in the deep low power consuming mode, power to the first and second waking-up circuit areas of the host transmission interface controller is turned off, and power to the inspecting circuit area is turned on.

6. The wireless communication apparatus as claimed in claim 2, wherein, in the fast wake-up mode, power to the first waking-up circuit area is turned off, and power to the second waking-up circuit area and the inspecting circuit area is turned on.

7. The wireless communication apparatus as claimed in claim 2, wherein the host transmission interface controller is configured to receive a wake-up signal originating from the host so as to restore the power state to the active mode, power to the first waking-up circuit area, the second waking-up circuit area and the inspecting circuit area being turned on in the active mode, the host transmission interface controller being restored to the power consuming mode prior to receipt of the wake-up signal after the host transmission interface controller receives packet data and makes a corresponding response.

8. The wireless communication apparatus as claimed in claim 1, wherein the processor is operable to accumulate the packet data from the communication device, and forward the accumulated packet data to the host when a predetermined wake-up time is reached.

9. The wireless communication apparatus as claimed in claim 8, wherein the processor is operable to switch the host transmission interface controller to the active mode when a pre-negotiated time is reached, and to notify the host to forward packet data accumulated by the host.

10. The wireless communication apparatus as claimed in claim 8, wherein the predetermined wake-up time is set such that wake-up intervals of the host transmission interface controller and the wireless transmission interface controller are synchronized.

11. The wireless communication apparatus as claimed in claim 8, wherein the predetermined wake-up time is set such that a wake-up interval of the host transmission interface controller and a wake-up interval of the wireless transmission interface controller have a multiple relation.

12. The wireless communication apparatus as claimed in claim 11, wherein the processor is operable to increase the wake-up interval of the host transmission interface controller when the host transmission interface controller does not receive packets within a duration including N consecutive wake-up intervals, where N is a positive integer.

13. The wireless communication apparatus as claimed in claim 8, wherein the processor is operable to inspect the traffic volume and set the predetermined wake-up time according to the traffic volume inspected thereby.

14. The wireless communication apparatus as claimed in claim 13, wherein the processor is operable to increase a wake-up interval of the host transmission interface controller when a duration in which the traffic volume is smaller than a predetermined value exceeds a predetermined length of time.

15. The wireless communication apparatus as claimed in claim 1, wherein the traffic volume is inspected by the processor and is the traffic volume between the wireless communication apparatus and at least one of the host and the communication device.

16. A power management method for a wireless communication apparatus, the power management method to be implemented using a processor of the wireless communication apparatus, the wireless communication apparatus being coupled to a host through a host transmission interface thereof and communicating with a communication device through a wireless transmission interface thereof, the processor being coupled between a host transmission interface controller and a wireless transmission interface controller, the power management method comprising:

inspecting a traffic volume;
comparing the traffic volume with a first threshold value;
controlling the host transmission interface controller to enter a power consuming mode with relatively lower power consumption when the traffic volume is smaller than the first threshold value; and
controlling the host transmission interface controller to enter another power consuming mode with relatively greater power consumption when the traffic volume is larger than the first threshold value, wherein the other power consuming mode is wherein the processor is operable to control the host transmission interface controller to enter a deep low power consuming mode when the traffic volume is smaller than the first threshold value, a fast wake-up mode when the traffic volume is not smaller than the first threshold value and is smaller than the second threshold value larger than the first threshold value, and an active mode when the traffic volume is greater than the second threshold value; determined based on the first threshold value and a second threshold value,
wherein the processor is operable to accumulate packet data from a communication device coupled to the wireless transmission interface controller, and forward the accumulated packet data to the host when a predetermined wake-up time is reached, wherein the predetermined wake-up time is set such that wake-up intervals of the host transmission interface controller and the wireless transmission interface controller are synchronized.

17. The power management method as claimed in claim 16, the host transmission interface controller including a first waking-up circuit area, a second waking-up circuit area, and an inspecting circuit area for inspecting a bus of the host transmission interface, wherein the processor is operable to selectively turn off power to the first waking-up circuit area, or turn off power to the first waking-up circuit area and the second waking-up circuit area depending on the power consuming mode.

18. The power management method as claimed in claim 17, wherein, in the deep low power consuming mode, power to the first and second waking-up circuit areas of the host transmission interface controller is turned off, and power to the inspecting circuit area is turned on.

19. The power management method as claimed in claim 17, wherein, in the fast wake-up mode, power to the first waking-up circuit area is turned off, and power to the second waking-up circuit area and the inspecting circuit area is turned on.

20. The power management method as claimed in claim 16, wherein the processor is operable to switch the host transmission interface controller to the active mode when a pre-negotiated time is reached, and to notify the host to forward packet data accumulated by the host.

21. The power management method as claimed in claim 16, wherein the processor is operable to set the predetermined wake-up time according to the traffic volume.

\* \* \* \* \*